Aug. 4, 1931. J. G. HAWLEY 1,817,255
COUPLING
Original Filed May 29, 1925  2 Sheets-Sheet 1
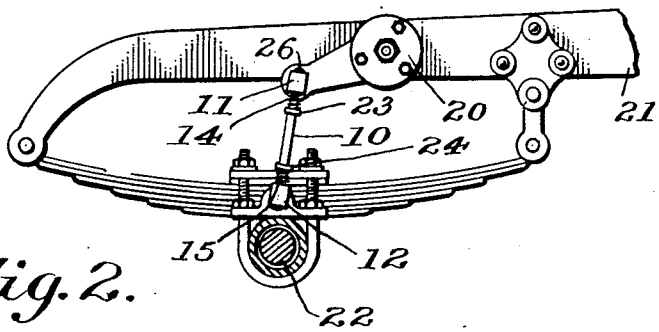
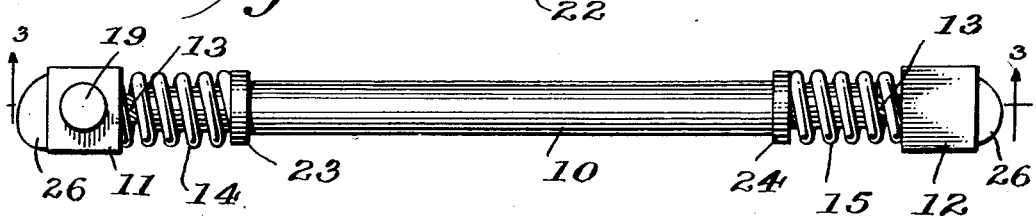
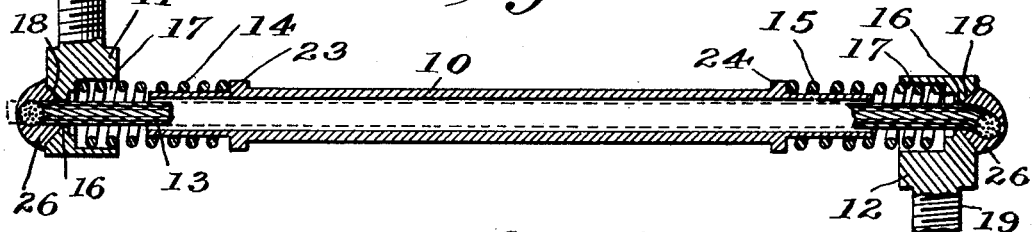
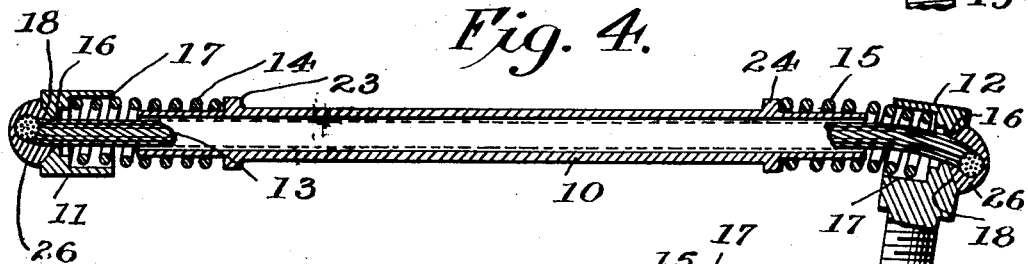
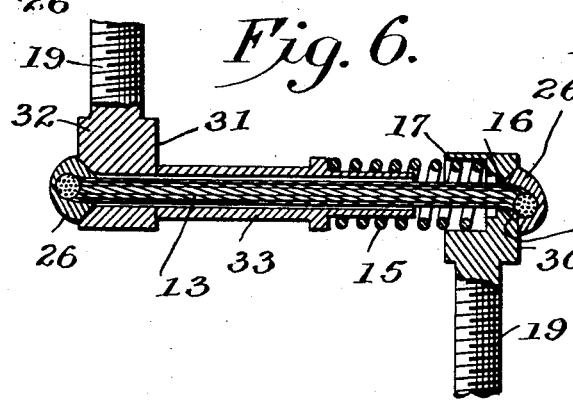
INVENTOR
*JESSE G. HAWLEY.*
BY Albert T. St Clair
ATTORNEY Aug. 4, 1931.　　　J. G. HAWLEY　　　1,817,255
COUPLING
Original Filed May 29, 1925　　2 Sheets-Sheet 2
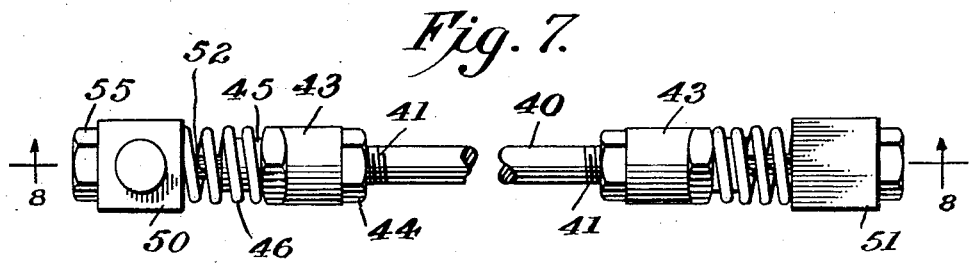
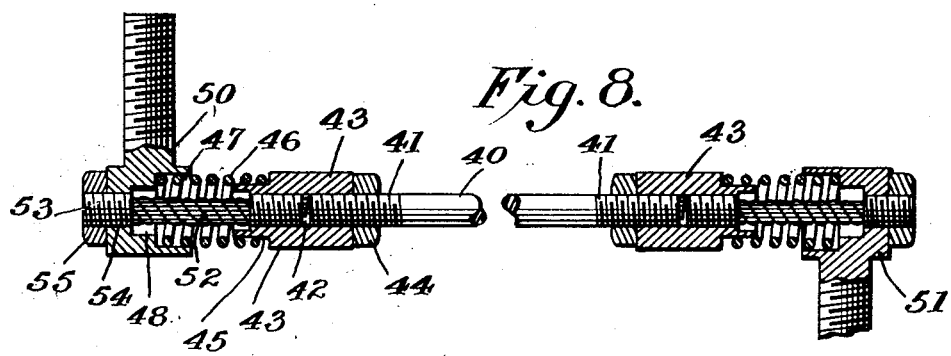
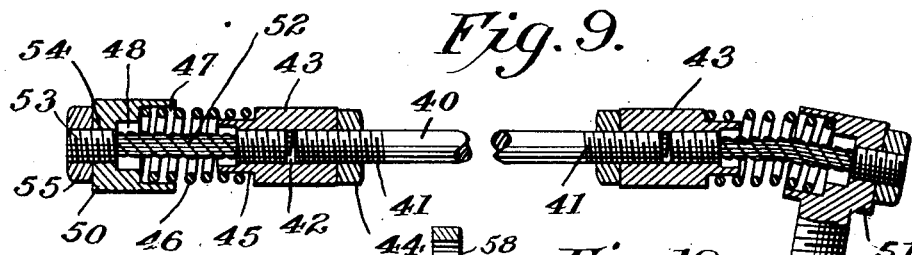
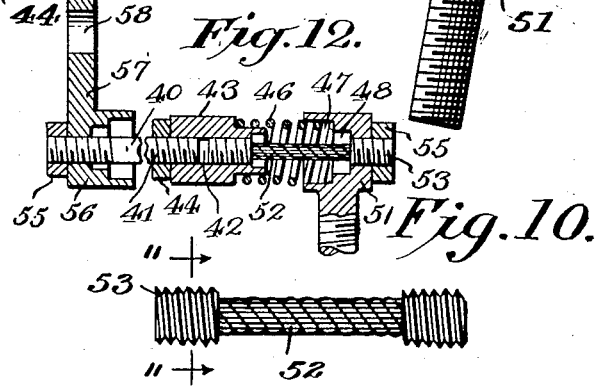
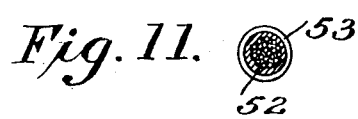
INVENTOR
JESSE G. HAWLEY.
BY
Albert T. St Clair
ATTORNEY Patented Aug. 4, 1931

1,817,255

UNITED STATES PATENT OFFICE

JESSE G. HAWLEY, OF PAINTED POST, NEW YORK

COUPLING

Application filed May 29, 1925, Serial No. 33,688. Renewed November 19, 1930.

This invention relates to the art of couplings, and more particularly to a flexible joint or connecting link.

It is an object of this invention to provide a cheap, simple and efficient coupling whose component parts can be twisted or bent in any direction relative to one another.

It is another object of this invention to provide a flexible coupling which shall possess great tensile strength.

It is a further object of this invention to provide a flexible coupling which shall be able to resist a predetermined compression.

It is a still further object of this invention to provide a flexible coupling which is adjustable to take up wear.

It is also an object of this invention to provide flexible couplings composed of standardized parts which can easily be repaired and which can be assembled to form couplings of any desired length by simply utilizing connecting bars of different lengths.

With the above and other objects in view, which will be apparent as the description proceeds, I have disclosed my invention in the following specification taken in connection with the accompanying drawings, in which:

Fig. 1 is a side elevation showing the manner in which a flexible connecting link embodying my invention is mounted when used to attach shock absorbers to a vehicle;

Fig. 2 is an enlarged plan view of the connecting link shown in Fig. 1, but with the end caps disposed in opposite directions;

Fig. 3 is a longitudinal section on the line 3—3 of Fig. 2;

Fig. 4 is a longitudinal section through the connecting link shown in Fig. 2, but showing one end cap twisted to a position at right angles to that shown in Fig. 3 and the other end cap bent at an angle to the body of the link;

Fig. 5 is a section through one of the end caps shown in the preceding figures, taken diagonally to show the method of anchoring the cable;

Fig. 6 is a longitudinal section through a coupling which has a flexible joint at one end only;

Fig. 7 is a plan view of a modified form of connecting link;

Fig. 8 is a longitudinal section on the line 8—8 of Fig. 7;

Fig. 9 is a longitudinal section through the connecting link shown in Fig. 7, but showing one end cap twisted to a position at right angles to that shown in Fig. 8 and the other end cap bent at an angle to the body of the link;

Figs. 10 and 11 are detail views, in elevation and transverse section respectively, of one of the standardized flexible cable units utilized in the connecting links illustrated in Figs. 7—9; and Fig. 12 is a longitudinal section through a coupling of the type illustrated in Figs. 7—9 but with a flexible joint at one end only; and also showing a further modified form of end cap.

In many commercial constructions it is highly essential that couplings be employed which are not only rigid in themselves but which permit relative angular and rotary movements of the body of the coupling and the structure to which it is attached.

Prior constructions, such as ball and socket joints, while permitting rotary movement of the parts on the axis of the connecting rod attached to the ball, do not provide for lateral movement of the rod and hence lack a universal movement. This renders them unsatisfactory for many commercial requirements, such as shock absorbers, connecting links for four-wheel brakes, and aeroplane controls.

With a view to providing a flexible coupling having a universal movement and adapted for a wide range of uses, of which those just mentioned are typical examples, I have developed the construction disclosed herein.

In the accompanying drawings, and particularly in Figs. 1—4 and 7—9 thereof, I have illustrated the application of my invention to a flexible connecting link.

Referring first to Figs. 1—5, one form of my connecting link comprises a tube 10 of the desired length, a pair of end caps 11 and 12, a flexible cable 13, a pair of coiled compression springs 14 and 15, and means for connecting these parts. As indicated in Figs. 2, 3 and 4, each end cap is provided with an opening 16 which is enlarged at one side at 17, and countersunk at the opposite side at 18. One end of each cap is provided with a threaded portion 19 for convenient attachment to the parts it is desired to connect, which, as indicated in Fig. 1, may be a shock absorber 20, attached to the frame 21 and axle 22 of a vehicle.

The tube 10 is also provided near each end with collars 23 and 24, which are integral with, or securely attached to, the tube 10 for the purpose indicated below.

The parts just discussed are assembled as follows: One end of the flexible cable 13 is inserted in the enlargement 17 of opening 16 in end cap 11, and allowed to project through the countersunk portion 18 as indicated in dotted lines at the left of Fig. 3. The projecting end of the cable is then bent back upon itself and inserted in a recess 25, with which each end cap is provided, and firmly secured therein in any suitable manner, as by sweating, brazing or soldering, or a combination of these.

I prefer to allow the end of cable 13 to extend nearly to the bottom of opening 25, sweat it therein, and then solder the portion of the cable which extends between openings 16 and 25. The brazing or soldering material 26 also preferably closes up the countersunk portion 18 of opening 16 and the inner end of opening 25.

A compression spring 14 is then sleeved on one end of the tube 10, bearing against the collar 23, the free end of the flexible cable is passed through spring 14 and tube 10, and the opposite end of spring 14 is received in the enlarged portion 17 of opening 16. The second compression spring 15 is then sleeved on the other end of the tube 10, with one end bearing against collar 24, the free end of the cable is inserted through opening 16 of end cap 12, and the opposite end of spring 15 is received in the enlargement 17 of opening 16. The end of the cable is then bent back upon itself and inserted in recess 25 of end cap 12. The parts are then subjected to the desired compression, with the tube 10 close to but not touching the end caps, and the cable is fastened to end cap 12 in the manner indicated above.

As indicated in Fig. 4, the end caps may be bent at any desired angle with reference to the tube, or may be twisted with reference thereto.

By passing the cable through opening 16, bending it back upon itself and fastening it in recess 25, I secure a firm connection between the cable and end cap, and the strain which tends to separate the end caps from the tube is thus distributed between the cable, the end cap, and the joint between these parts, instead of making it necessary for the joint to withstand the entire strain.

In Fig. 6 I have disclosed a modified coupling which is really a flexible joint, this construction differing from that disclosed in Figs. 1—5 mainly in the fact that the flexible joint is provided at one end only. The flexible joint 30, shown in this figure, is preferably made in the manner indicated above, and the rigid end 31 may assume any desired form, it being herein indicated as an end cap 32, securely united to a tubular member 33 of any desired length by welding or brazing. Obviously, however, the cap could be made integral with the tube.

If the cable should become stretched by use it is only necessary to remove the connecting portions 19 from the mechanism to which they are connected, give the end caps a whole or partial turn in the direction in which the strands of the cable are wound, and reattach the connecting portions 19 to the mechanism to be connected by the coupling.

Referring now to Figs. 7—11, in which I have shown another embodiment of my invention, 40 designates a solid rod, preferably of steel, of any desired length, which is threaded at each end at 41, each of the threaded portions being received in a correspondingly threaded recess 42 in a hollow spacing sleeve 43. Each spacing sleeve 43 is adjusted to the desired position on rod 40 and held in that position by a lock nut 44. The end of each hollow spacing sleeve opposite to that at which the rod 40 entered is reduced in diameter at 45 to receive a coiled spring 46 similar to the springs 14 and 15 in Figs. 1—6. The opposite end of each coiled spring 46 is received in an enlargement 47 of an opening 48 in an end cap 50 or 51. The latter correspond generally to the end caps 11 and 12 of Figs. 1—5 and are united to the rod 40 and spacing sleeves 43 by flexible cables 52 similar to the cable 13.

Instead, however, of retaining the flexible cable in the end cap by sweating, brazing or soldering, as illustrated in Figs. 1—6, I employ the method shown in detail in Figs. 10 and 11, in which each end of a cable 52 is secured in a correspondingly threaded sleeve 53 by compressing the material of the sleeve upon the cable with the aid of hydraulic pressure. As indicated in Fig. 11, this forces the outer strands of the cable into the walls of the sleeve 53. One end of the cable unit, formed in this manner, is threaded into one of the sleeves 43 and the opposite end is threaded into an opening 54 in the end cap 50. The latter is then twisted until the spring 46 is placed under the desired compression, whereupon a lock nut 55 is applied to hold the parts in the desired relation. End cap 51 is attached to the other sleeve 43 in a similar manner to form the construction shown in Figs. 7—9.

It will be obvious that the end caps 50 and 51 can be twisted or bent at any desired angle to rod 40 just as in the construction illustrated in Figs. 1—6. It should be noted, however, that the construction shown in Figs. 7—9 consists of parts which can easily be standardized. This is advantageous since by merely changing the length of the rod 40 a coupling of any desired length can be obtained. Furthermore, any part can readily be replaced should that become necessary.

It will also be apparent that the construction shown in Figs. 7—9 may be altered to provide a coupling which is flexible at one end only, by omitting one set of the spacing sleeves 43, cable units 52—53, and springs 46, and attaching that end of the rod 40 directly to the end cap 51.

In Fig. 12 I have illustrated such a construction and have shown it in connection with an end cap 56 which differs from the end caps 50 and 51 shown in Figs. 7—9 by having an anchoring lug 57, which is preferably of the same width as the body of the end cap but which is of considerably less thickness than said body. Furthermore, instead of being threaded, as shown in Figs. 8—9, this end cap is perforated at 58 to receive any suitable connecting clamp, such as the spring bolt of an automobile.

Any suitable materials may be utilized for the parts of my flexible coupling but it will be obvious that they are so chosen as to withstand the stresses and strains to which they are to be subjected. By way of illustration, but without limiting myself thereto, I will state that I prefer to form the tubes 10 and 33 of Shelby tubing, the end caps 11, 12, 32, 50, 51 and 56 of high grade steel, and the cables 13 and 52 of a multiple strand steel wire construction, which will withstand a tension of approximately 20,000 pounds.

The compression springs 14, 15 and 46 are made of high grade steel wire and are so chosen and assembled that they will be under sufficient compression to prevent further compression under the load they are designed to carry. This compression can of course, be varied in assembling couplings intended to carry different loads.

By surrounding the cable with the compression springs, as indicated herein, bending movements are resisted mainly by the latter, while twisting movements are resisted by the cable, inasmuch as the outer ends of the compression springs are loose and therefore free to turn in the enlargements 17 of openings 16 and the enlargements 47 of openings 48.

As indicated in Figs. 2, 3 and 4, the enlargements 17 of the openings 16 in the end caps are enough larger than the cable 13 so that the latter will have free play when the end caps are bent with reference to the tube 10, to prevent chafing the cable. Also, by having the ends of the springs received in the openings 16 the cable will ride on the inside of the springs instead of on the end caps when the cable is bent. The same is true of the corresponding parts of the constructions shown in Figs. 6—9 and 12.

It will therefore be apparent that I have devised a highly efficient flexible coupling which cannot be compressed in the direction of its length, until the compression exceeds a predetermined amount owing to the compression of the springs, and which is therefore sufficiently rigid to transmit movements imparted to it, and yet is so constructed that the end caps can be moved to any desired angle with reference to the tubular or rod members but cannot be separated therefrom owing to the tension of the cable and the strength of the joint between the cable and the end caps.

It will be understood that this construction may be altered in various ways to form any desired shape of flexible coupling for transmitting movements imparted to it, that the coupling may be in the form of a flexible connecting link or merely a flexible joint, and that the cable may be anchored to the end caps in other ways than those described, without departing from the spirit and scope of the appended claims.

I claim:

1. A flexible joint comprising two spaced rigid members, a flexible cable connecting them and permitting torsional and bending movements therebetween, and means for taking the bending strain off from the cable.

2. A flexible joint comprising two rigid members, a flexible cable connecting them and permitting torsional and bending movements therebetween, and means for taking the bending strain off from the cable, said means comprising a flexible compression spring introduced between the rigid members.

3. A flexible joint comprising two rigid members, one of which is provided with a collar and the other with a recess, a flexible cable connecting the rigid members without preventing torsional and bending movements therebetween, and means for taking the bending strain off from the cable, said means comprising a flexible compression spring sleeved on one of the rigid members and bearing against the collar thereon, and seated in the recess in the other rigid member.

4. A flexible connecting link comprising a rigid body member, rigid end caps, springs interposed between the body member and the end caps, and flexible means connecting the body member and the end caps.

5. A flexible connecting link comprising a rigid body member, rigid end caps, springs interposed between the body member and the end caps, and flexible steel wire cable connecting the body member and the end caps.

6. A flexible connecting link comprising a rigid body member, rigid end caps, springs interposed between the body member and the end caps, and flexible steel wire cable connecting the end caps to the body member, the end caps being recessed to prevent chafing of the cable when it is moved with reference thereto.

7. A flexible connecting link comprising a rigid body member, rigid end caps, flexible steel wire cable connecting these members, and means interposed between the body member and the end caps to relieve the cable of strains incident to bending the end caps with reference to the body member.

8. A connecting link comprising a rigid body member, rigid end caps, coiled springs sleeved on the body member between its end portions and the end caps, and means for flexibly connecting the end caps to the body member in such a manner that the springs are placed under compression.

9. A flexible connecting link comprising a rigid body member, rigid end caps, coiled springs sleeved on the body member between its end portions and the end caps, and flexible steel wire cable connecting the end caps to the body member in such a manner that the springs are placed under compression.

10. A connecting link comprising a rigid body member, collars formed on the body member adjacent to its ends, rigid end caps, coiled springs sleeved on the body member between the collars and the end caps, and means for flexibly connecting the end caps to the body member in such a manner that the springs are placed under compression.

11. A flexible joint comprising two rigid members connected by a flexible member, a spring sleeved on the flexible member and interposed between the two rigid members, and means cooperating with the flexible member for subjecting the spring to the desired compression.

12. A flexible joint comprising two rigid members connected by a flexible cable, a spring sleeved on the cable and interposed between the two rigid members, and means for subjecting the spring to the desired compression.

13. A flexible connecting link comprising a rigid body member, rigid end caps, coiled springs sleeved on the body member between its end portions and the end caps, and flexible cable units connecting the end caps to the body member in such a manner that the springs are placed under compression.

14. A flexible connecting link comprising a rigid body member, rigid end caps, coiled springs sleeved on the body member between its end portions and the end caps, and flexible cable units connecting the end caps to the body member in such a manner that the springs are placed under compression, each cable unit consisting of a section of steel wire cable having a threaded sleeve compressed on each end thereof.

JESSE G. HAWLEY.